United States Patent
Pardhan et al.

(10) Patent No.: US 11,585,909 B2
(45) Date of Patent: Feb. 21, 2023

(54) LASER SAFETY COMPARATOR

(71) Applicant: Waymo LLC, Mountain View, CA (US)

(72) Inventors: Rahim Pardhan, San Francisco, CA (US); Blaise Gassend, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 1051 days.

(21) Appl. No.: 16/227,156

(22) Filed: Dec. 20, 2018

(65) Prior Publication Data
US 2020/0142040 A1  May 7, 2020

Related U.S. Application Data

(60) Provisional application No. 62/755,377, filed on Nov. 2, 2018.

(51) Int. Cl.
| | | |
|---|---|---|
| *G01S 7/497* | (2006.01) | |
| *G01S 7/484* | (2006.01) | |
| *G01S 17/10* | (2020.01) | |

(52) U.S. Cl.
CPC .............. *G01S 7/497* (2013.01); *G01S 7/484* (2013.01); *G01S 17/10* (2013.01)

(58) Field of Classification Search
CPC .......... G01S 7/497; G01S 7/484; G01S 17/10; G01S 7/48–51
See application file for complete search history.

(56) References Cited

U.S. PATENT DOCUMENTS

| | | | |
|---|---|---|---|
| 6,707,833 B1* | 3/2004 | Kimbrough | H01S 5/0683 |
| | | | 372/38.07 |
| 6,748,180 B2* | 6/2004 | Feng | H04B 10/502 |
| | | | 398/186 |
| 7,262,584 B2 | 8/2007 | Crawford et al. | |
| 9,595,807 B2 | 3/2017 | Fingerle | |
| 9,791,557 B1* | 10/2017 | Wyrwas | G01S 7/497 |
| 9,817,122 B2 | 11/2017 | Metzler et al. | |
| 9,853,545 B2 | 12/2017 | Wyland | |

(Continued)

FOREIGN PATENT DOCUMENTS

KR  10-2018-0058067  5/2018

OTHER PUBLICATIONS

International Searching Authority, International Search Report and Written Opinion dated Feb. 11, 2020, issued in connection with International Patent Application No. PCT/US2019/057434, filed on Oct. 22, 2019, 9 pages.

*Primary Examiner* — Luke D Ratcliffe
(74) *Attorney, Agent, or Firm* — McDonnell Boehnen Hulbert & Berghoff LLP

(57) ABSTRACT

The present disclosure relates to systems and methods that facilitate compliance of a laser device with a laser safety threshold. An example method includes receiving, from a sensing circuit, an operating voltage that is indicative of a charge of a capacitive element of a laser pulser circuit. The method also includes comparing a first voltage indicative of the operating voltage and a second voltage indicative of a reference voltage. The method additionally includes providing an output value based on the comparing. The method yet further includes evaluating compliance with the laser safety threshold based on the output value.

20 Claims, 3 Drawing Sheets

(56) References Cited

U.S. PATENT DOCUMENTS

| | | |
|---|---|---|
| 2013/0250272 A1 | 9/2013 | Ludwig |
| 2015/0116695 A1 | 4/2015 | Bartolome et al. |
| 2018/0259625 A1 | 9/2018 | Gnecchi et al. |
| 2018/0284229 A1 | 10/2018 | Liu et al. |
| 2019/0052258 A1* | 2/2019 | Donovan ......... H03K 19/00369 |
| 2020/0041609 A1* | 2/2020 | Ames ................... G01S 17/931 |

* cited by examiner

LASER SAFETY COMPARATOR

CROSS-REFERENCE TO RELATED APPLICATION

The present application claims the benefit of U.S. Patent Application No. 62/755,377, filed Nov. 2, 2018, the content of which is herewith incorporated by reference.

BACKGROUND

Conventional laser driver circuits may provide signals (e.g., specific currents and/or voltages) to a laser light-emitting device (e.g., a laser diode). In turn, the laser light-emitting device may emit constant or pulsed laser light.

SUMMARY

The present disclosure generally relates to laser systems configured to provide pulses of laser light.

In a first aspect, a system is provided. The system includes a laser pulser circuit. The laser pulser circuit includes a light-emitter device, a capacitive element, and at least one field effect transistor (FET). The system also includes a sensing circuit coupled to the capacitive element. The sensing circuit includes an operating voltage node configured to provide an operating voltage indicative of a charge of the capacitive element. The sensing circuit also includes a comparator. The comparator includes a first input coupled to the operating voltage node, a second input coupled to a reference voltage source, and an output. The system also includes a controller. The controller is coupled to the second input and the output. The controller is configured to carry out operations. The operations include controlling a reference voltage provided by the reference voltage source. The operations also include causing the comparator to compare a first voltage at the first input and a second voltage at the second input so as to provide an output value at the output. The first voltage is indicative of the operating voltage and the second voltage is indicative of the reference voltage. The operations also include evaluating compliance with a laser safety threshold based on the output value.

In a second aspect, a method is provided. The method includes receiving, from a sensing circuit, an operating voltage that is indicative of a charge of a capacitive element of a laser pulser circuit. The method also includes comparing a first voltage indicative of the operative voltage and a second voltage indicative of a reference voltage. The method yet further includes providing an output value based on the comparing and evaluating compliance with a laser safety threshold based on the output value.

In a third aspect, a system is provided. The system includes a lidar. The lidar includes a laser pulser circuit and a sensing circuit coupled to the laser pulser circuit. The sensing circuit is configured to compare a reference voltage and an operating voltage indicative of a charge of a capacitive element in the laser pulser circuit. The lidar also includes a controller coupled to the sensing circuit. The controller is configured to carry out operations including controlling emission of light pulses from the laser pulser circuit based on output from the sensing circuit.

Other aspects, embodiments, and implementations will become apparent to those of ordinary skill in the art by reading the following detailed description, with reference where appropriate to the accompanying drawings.

DETAILED DESCRIPTION

Figure 1:
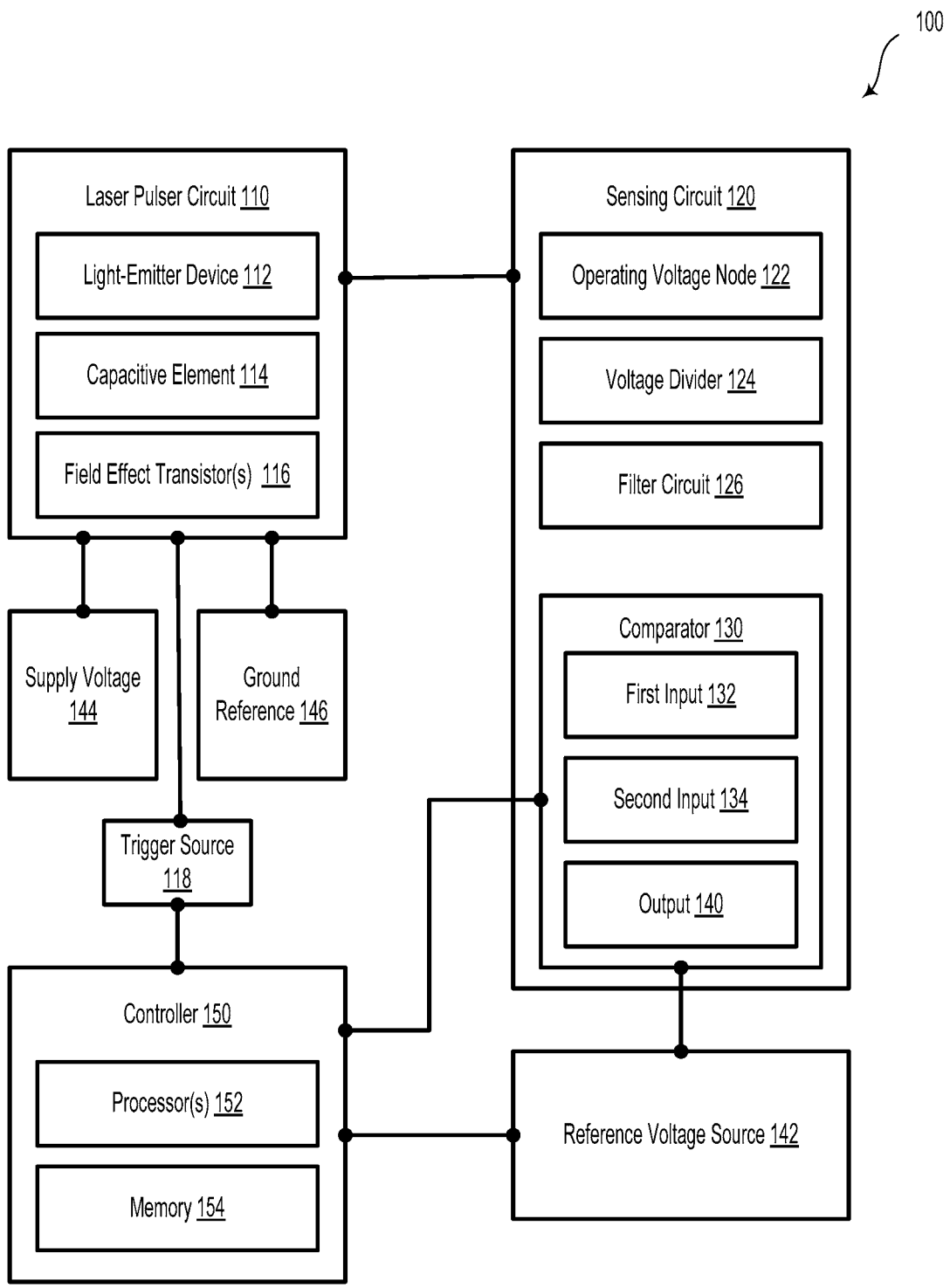
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A light detection and ranging (LIDAR or lidar) device could be configured to emit light pulses into an environment using one or more light-emitter devices (e.g., laser diodes). The emission of the light pulses could be performed by a pulser circuit. In some embodiments, the pulser circuit could include a laser diode, a capacitive element, and a field effect transistor (FET), such as a GaN FET. Other types of high-voltage (100+ volts) fast-switching transistors are contemplated. For example, the FETs may include SiC (e.g., SiCFET) and/or may be configured for use in microwave applications. In some embodiments, the FETs may be flip-chip or surface-mount devices.

In an example embodiment, the laser diode and the GaN FET could be connected in series between a supply voltage and a ground reference. The capacitive element could be connected between the supply voltage and the ground reference in parallel with the series combination of the laser diode and GaN FET. In some embodiments, when the GaN FET is closed, charge stored on the capacitive element could flow through the laser diode so as to emit a light pulse. In such scenarios, when the GaN FET is open, the capacitive element could charge up from the supply voltage, so as to prepare the pulser circuit to emit another light pulse.

In an example embodiment, the laser diode may be configured to provide laser light over very short pulse lengths, e.g., 2 nanoseconds. At various times (e.g., prior to and/or while emitting the light pulses), it may be desirable to determine one or more aspects of the pulser circuit so as to reliably predict an amount of energy that is being emitted into the environment on a per pulse basis. For example, a pulser circuit may be coupled to a sensing circuit that could measure a voltage across the capacitive element prior to the capacitive element discharging its stored charge through the laser diode.

In some embodiments, the sensing circuit could include: a voltage divider, a comparator, a filter circuit (e.g., an RC circuit), and a controller. In some embodiments, the voltage divider is connected in parallel to the capacitive element. The voltage divider could include, for example, two resistors connected in series. In such a scenario, the voltage divider could include an operating voltage node connecting the two resistors.

The comparator could include, for example, a dedicated voltage comparator chip. Additionally or alternatively, the comparator could include an operational amplifier. Other circuits and/or electrical components useful to compare two voltage values are possible and contemplated.

A first input of the comparator (e.g., a non-inverting input of an operational amplifier) could be connected to the operating voltage node of the voltage divider. In such a scenario, a second input (e.g., an inverting input of the operational amplifier) of the comparator could be connected to ground by way of a capacitor of the RC circuit. Furthermore, the second input of the comparator could be connected to the controller by way of a resistor of the RC circuit. In some embodiments, the controller may be configured to adjust a reference voltage provided to the second input of the comparator. An output value provided at an output of the comparator could include, for example, a positive or negative voltage indicative of a voltage difference between respective voltages present at the first and second inputs of the comparator. Additionally or alternatively, the output of the comparator could include a digital output (e.g., +5V or −5V). The output of the comparator could be connected to the controller.

In some embodiments, the controller could include, for example, a field-programmable gate array (FPGA), an application-specific integrated circuit (ASIC), or another type of computing device, such as a processor.

In some embodiments, the controller could include information indicative of one or more laser safety standards (e.g., maximum power levels or maximum pulse energy levels) and could be configured to evaluate compliance with the one or more laser safety standards based on the output value from the comparator. In this way, systems and methods described herein could be utilized to confirm that the LIDAR system is operating within health and safety guidelines.

Additionally or alternatively, the controller could utilize other information, such as whether other components of the LIDAR system (e.g., spinning mirror, spinning optical component, etc.) are operating. In such a scenario, the controller could adjust the reference voltage based on the operational characteristics of the other components of the LIDAR system.

II. Example Systems and Circuits

FIG. 1 illustrates a system 100, according to an example embodiment. The system 100 includes a laser pulser circuit 110. The laser pulser circuit 110 includes a light-emitter device 112. The laser pulser circuit 110 also includes a capacitive element 114 and at least one field effect transistor (FET) 116.

In some embodiments, the light-emitter device 112 and the at least one FET 116 are connected in a series combination between a supply voltage 144 and a ground reference 146. In such examples, the capacitive element 114 is connected in parallel to the series combination. In an example embodiment, the supply voltage 144 may include a voltage of greater than 100 volts. However, other values for the supply voltage are possible within the context of the present disclosure.

The at least one FET 116 could include one or more NMOS, enhancement-mode, surface mount transistors. In such a scenario, the light-emitter device 112 may be coupled to a drain terminal of the at least one FET 116. A source terminal of the at least one FET 116 is coupled to a ground terminal.

In an example embodiment, the at least one FET 116 may include gallium nitride (GaN). That is, in such examples, the at least one FET 116 may be a GaNFET device. Additionally or alternatively, the at least one FET 116 may include silicon carbide (SiC). That is, the at least one FET 116 could be a SiC FET device. Yet further, the at least one FET 116 may include a high electron mobility transistor (HEMT).

The at least one FET 116 could be in the form of a surface-mount device. However, other form factors for the at least one FET 116 are contemplated.

In one embodiment, system 100 may include a return diode connected between the drain terminal of the at least one FET 116 and the supply voltage 144.

In embodiments, the laser pulser circuit 110 could be coupled to a trigger source 118. For example, a gate terminal of the at least one FET 116 could be coupled to the trigger source 118. In such scenarios, the trigger source 118 may include a waveform generator, a pulse signal generator, or another type of device configured to provide a trigger pulse or trigger signal.

In some embodiments, a second FET may be utilized to replace and/or augment capacitive element 114 and to reduce oscillations in the system. In particular, the second FET may be configured to reduce or eliminate a negative voltage between a drain terminal and a source terminal of the at least one FET 116. In an example embodiment, under some operating conditions of the system 100, the second FET may include a body diode, which may be formed by a p-n junction that connects the drain and source terminals of the second FET. As such, the body diode may act as a parallel shunt diode, which may provide a path for reverse drain current (e.g., free-wheeling current). As described elsewhere herein, the second FET may act as a capacitor (e.g., capacitive element 114) having a capacitance that scales inversely with bias. For example, the second FET may include a capacitance that is higher after a pulse as compared to the capacitance while energy is being discharged through the light-emitter device 112. In some embodiments, a drain terminal of the second FET could be coupled to the supply voltage 144. A source terminal of the second FET and a gate terminal of the second FET could be coupled to ground. In some embodiments, the second FET could be a GaN FET.

When a switch formed by the FET 116 is open, the capacitive element 114 is charged by the supply voltage, so as to prepare the laser pulser circuit 110 to emit a laser light pulse. In some embodiments, the capacitive element 114 could be charged to a voltage approximately twice the supply voltage, or more.

When a switch formed by the FET 116 is closed, charge stored on the capacitive element 114 flows through the light-emitter device 112 so as to emit a light pulse.

System 100 includes a sensing circuit 120. The sensing circuit 120 includes an operating voltage node 122. The sensing circuit 120 is coupled to the capacitive element 114 such that the operating voltage node 122 provides an operating voltage indicative of a charge of the capacitive element 114.

In some embodiments, the sensing circuit 120 also includes a voltage divider 124. In such scenarios, the operating voltage node 122 corresponds to a node of the voltage divider 124.

The system 100 includes a comparator 130. The comparator 130 includes a first input 132 coupled to the operating voltage node 122. The comparator 130 also includes a second input 134 coupled to a reference voltage source 142. The comparator 130 also includes an output 140.

The system 100 includes a controller 150. The controller 150 includes at least one of a field-programmable gate array (FPGA) or an application-specific integrated circuit (ASIC). Additionally or alternatively, the controller 150 may include one or more processors 152 and a memory 154. The one or more processors 152 may be a general-purpose processor or a special-purpose processor (e.g., digital signal processors, etc.). The one or more processors 152 may be configured to execute computer-readable program instructions that are stored in the memory 154. As such, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of system 100. As such, the memory 154 may include program instructions to perform or facilitate some or all of the functionality described herein. In some embodiments, the controller 150 is coupled to the second input 134 and the output 140.

In some examples, the sensing circuit 120 also includes a filter circuit 126, which could include a low-pass filter such as a resistor capacitor (RC) circuit. The controller 150 is coupled to the second input 134 by way of the filter circuit 126. In the case of an RC circuit, the controller 150 could be coupled to the second input 134 by way of a resistor of the RC circuit. It will be understood that other ways are contemplated so as to couple the second input 134 to the controller 150 via the filter circuit 126. In some embodiments, the filter circuit 126 could be configured to allow a digital output on the controller 150 to set an analog signal level of the comparator 130. Additionally or alternatively, the filter circuit 126 could include higher order filters (e.g., a Butterworth filter), which may improve the ability to quickly adjust the reference voltage given a limited maximum frequency for the output of the controller 150.

The controller 150 is configured to carry out operations. In some embodiments, controller 150 may carry out the operations by way of the processor 152 executing instructions stored in the memory 154.

Figure 2:
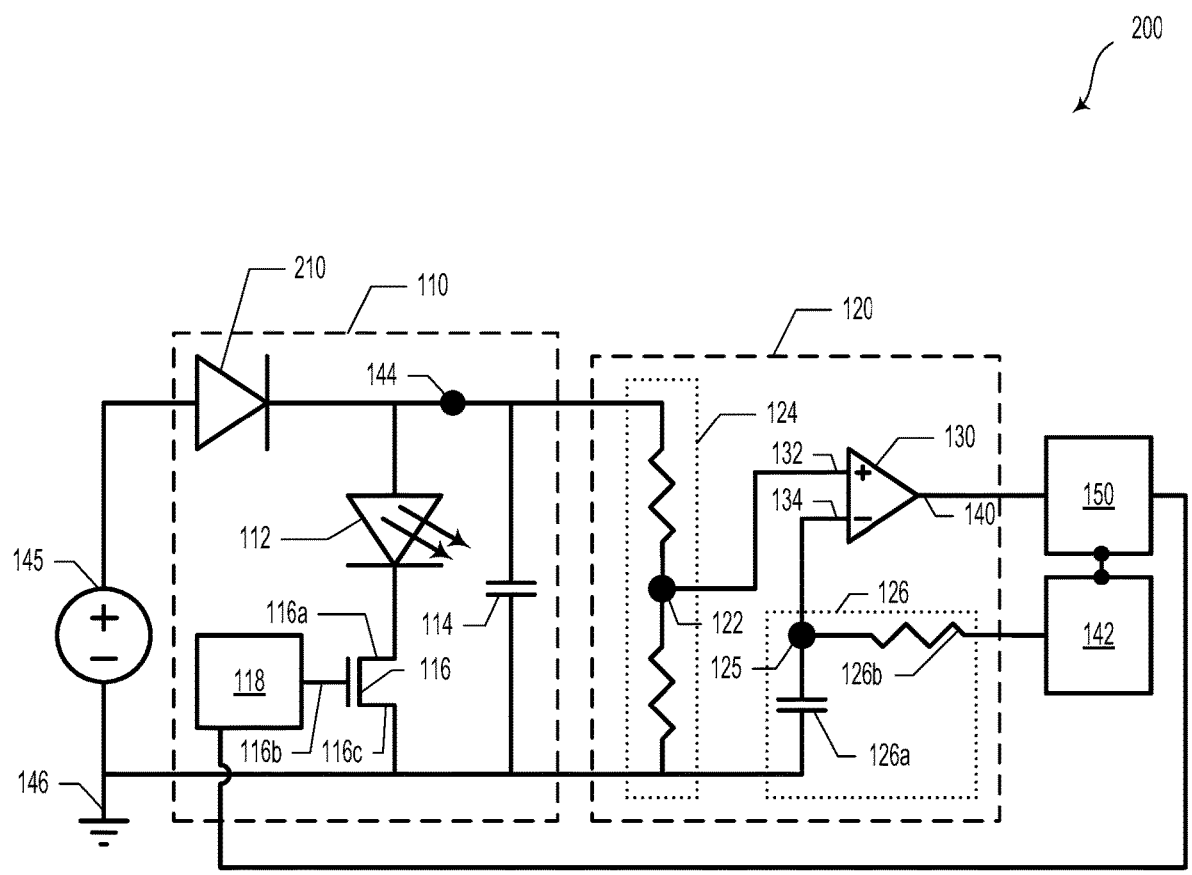
FIG. 2 illustrates a circuit, according to an example embodiment.

The operations could include controlling a reference voltage provided by the reference voltage source 142. The reference voltage source 142 could be a voltage source or power supply that is separate from, yet controllable by, the controller 150 (as illustrated in FIGS. 1 and 2). Alternatively, reference voltage source 142 could be integrated with the controller 150.

The operations could also include causing the comparator 130 to compare a first voltage at the first input 132 and a second voltage at the second input 134 so as to provide an output value at the output 140. The first voltage is indicative of the operating voltage and the second voltage is indicative of the reference voltage. In such a scenario, causing the comparator 130 to perform the comparison could include causing the controller 150 to send an enable signal to the comparator 130. In response to receiving the enable signal, the comparator 130 could provide the output value at the output 140. Additionally or alternatively, causing the comparator 130 to perform the comparison could be the result of the controller 150 adjusting and/or controlling the reference voltage source 142. Furthermore, causing the comparator 130 to perform the comparison could include providing the trigger source 118, or a signal synchronized with the trigger source 118, to the comparator 130 so as to enable the comparison. Other ways to cause the comparator 130 to perform the comparison are possible and contemplated.

The operations include evaluating compliance with a laser safety threshold based on the output value. In some embodiments, the output value could include a positive or negative voltage indicative of a voltage difference between the first voltage at the first input 132 and the second voltage at the second input 134. Additionally or alternatively, the output value could include a digital output indicative of a voltage difference between the first voltage at the first input 132 and the second voltage at the second input 134.

In some scenarios, evaluating compliance with the laser safety threshold based on the output value could include comparing the output value to one or more operating thresholds. For example, the one or more operating thresholds could include predetermined output value thresholds that correspond to respective operating states of the system.

In some embodiments, the compliance limit or laser safety threshold could be determined by measuring the optical output from a set of test parts or from a given assembled system. A correspondence between measured voltages across the capacitive element and threshold optical output levels could be obtained. In such scenarios, a threshold voltage value or values could be selected so as to remain within laser safety limits with margin (e.g., 5% or 10% safety margin, or more). The operating voltages could be adjusted so as to operate sufficiently below (e.g., ~5% to 10% below) that threshold voltage value. As such, spurious triggering can be avoided during normal system operations.

During normal operation, the reference voltage (e.g., reference voltage source 142) can be set to the threshold voltage limit described above. In some embodiments, during a characterization phase of operation, (e.g., during manufacturing and/or power on self-test) the reference voltage can be varied. In such scenarios, the electrical characteristics of the pulser circuit can be determined. For example, the characterization phase may provide information about how fast the pulser circuit charges and/or how fast the circuit discharges. The characterization phase may also provide information about the supply voltage value, among other possibilities.

During operation of the system, if the threshold voltage limit is exceeded, an interlock condition could be triggered and the system could be shut down permanently or semi-permanently until the interlock condition is cleared. In some embodiments, the system and methods described herein could include varying actions that could be taken when an interlock condition is triggered. For example, for a first violation of the threshold voltage limit, a short shut down (e.g., ~10 milliseconds) of the system could be enforced. Thereafter, further violations of the threshold voltage limit could result in a permanent shut down.

In some embodiments, the pulser circuit may "overshoot" during charging, which could result in a temporarily higher-than-expected voltage on the capacitive element. To avoid such scenarios, the comparison could be triggered to occur in a brief window before a given laser pulse or shot. Furthermore, in some embodiments, the comparison may be performed prior to shots that are sufficiently distant in time from the previous shot. Yet further, comparisons could be performed on a periodic or aperiodic schedule that ensures that safety checks are performed sufficiently often (e.g., at least every 100 milliseconds, every 50 milliseconds, every 1-2 milliseconds, or more frequently).

In example embodiments, filter circuit 126 could be selected to provide an adjustable reference voltage to the comparator 130 on a per-shot basis. For example, in the case of an RC filter circuit, the effective resistor and capacitance values of the RC filter circuit could be selected to provide a reference voltage that could be changed between temporally adjacent shots. In such scenarios, systems may be operable to vary maximum laser pulse amplitudes at different times and/or within different portions of the field of view.

Systems and methods described herein could also be useful to detect a shorted, or otherwise malfunctioning, FET (e.g., FET 116). A shorted FET condition is undesirable because it may result in connecting the laser diode directly to the power supply. Such a condition could result in providing a greater-than-expected amount of power to the laser diode. Under normal conditions, the voltage on the capacitive element 114 may overshoot the normal target voltage when the pulser circuit 110 is charged. However, in cases where the FET is shorted, the capacitive element 114 may not charge (or charge to an unexpected voltage). Accordingly, in such scenarios, the system may be operable to determine that there was no overshoot voltage waveform, which could indicate a suspected malfunctioning FET. In response, the system could temporarily or permanently disable firing of the light-emitter device.

The described systems and methods could additionally or alternatively be used to characterize various aspects of the pulser circuit 110. For example, sweeping the reference voltage while firing (or not firing) shots, the system could provide a reconstruction of the shot waveforms under various firing conditions to better characterize the circuit. Without limitation, such methods and systems could provide information on how fast the capacitive element charges, the supply voltage level, charge decay time if the capacitive element is not discharged immediately, etc. This information can be obtained during manufacturing testing, during power-on-self-test procedures, at periodic intervals during normal operation of the system (e.g., once an hour, once a day, once a week, etc.) and/or due to a triggering event (e.g., system malfunction, detected object, etc.).

Additionally or alternatively, the operations could include determining a current operating state of the system 100. In such scenarios, evaluating compliance with the laser safety threshold is further based on the current operating state of the system 100.

In an example embodiment, the controller 150 may cause the trigger source 118 to provide a trigger pulse signal so as to cause the light-emitter device 112 to emit a light pulse. That is, the controller 150 may be configured to trigger, adjust, and/or control the emission of laser light from the light-emitter device 112. In some embodiments, the laser pulse or pulses may include a pulse width of less than 2.5 nanoseconds. However, other pulse widths (e.g., 1-10 nanoseconds) are possible and contemplated herein.

In some embodiments, system 100 could include a vehicle, such as an automobile, a motorcycle, a truck, a boat, or an aircraft. In such scenarios, the current operating state of the system 100 could be based on a current operating state of the vehicle.

FIG. 2 illustrates a circuit 200, according to an example embodiment. Circuit 200 may be similar or identical to system 100 as illustrated and described with reference to FIG. 1. For example, some or all of the elements of circuit 200 may be similar or identical to corresponding elements of system 100.

Circuit 200 includes a light-emitter device 112, a FET 116, and a capacitive element 114. The circuit 200 may also include a voltage source 145, a trigger source 118, and a controller 150.

In an example embodiment, the light-emitter device 112 is coupled to a supply voltage 144, which may be provided, at least in part, by the voltage source 145. The light-emitter device 112 is also coupled to a drain 116a of the FET 116. A source terminal 116c of the FET 116 is coupled to a ground reference 146. In some embodiments, the supply voltage 144 may be greater than 100 volts.

As illustrated in FIG. 2, capacitive element 114 is coupled between the supply voltage 144 and the ground reference 146.

In an example embodiment, the FET 116 may be an NMOS enhancement mode FET. That is, when the trigger source 118 provides a signal such that a "high" gate-source voltage (e.g., a voltage between the gate 116b and the drain 116a) is greater than zero, the FET 116 may substantially operate as being "ON" or like a closed switch. When the trigger source 118 provides a "low" gate-source voltage (e.g., zero volts between the gate 116b and the drain 116a), the FET 116 may operate as being "OFF" or like an open switch.

In some embodiments, a gate 116b of the FET 116 may be coupled to the trigger source 118. In such a scenario, the trigger source 118 may be coupled to the controller 150. For example, the trigger source 118 may be a signal generator, such as a Tektronix 3390 Arbitrary Waveform Generator, which could be controlled by way of the controller 150. However, the trigger source 118 could additionally or alternatively be any other device or custom circuit (e.g., an Application-Specific Integrated Circuit, ASIC or Field-Programmable Gate Array, FPGA) configured to provide a continuous or pulsed voltage signal to the gate 116b. As an example, the trigger source 118 may include a Peregrine Semiconductor PE29100 high-speed FET driver. Additionally or alternatively, a MOSFET driver such as a Texas Instruments LM5114BMF could be used in conjunction with a P-type FET to drive the gate 116b of FET 116. Other types of gate driver circuits and/or components are possible and contemplated.

In some scenarios, the trigger source 118 may be operable to provide a trigger pulse to gate 116b, turning the FET 116 "ON" and causing the light-emitter device 112 to emit a light pulse. In an example embodiment, the light pulse may have a pulse width of less than 2.5 nanoseconds. Furthermore, the trigger source 118 may be operable to provide a pulse train of trigger pulses so as to cause the light-emitter device 112 to emit a laser pulse train of light pulses, each laser pulse of the pulse train having a pulse width of less than 2.5 nanoseconds.

One of ordinary skill in the art would understand that many other variations of circuit 200 are possible to provide a fast switching capability and/or provide sub-2.5 nanosecond light pulse widths. For example, the circuit 200 could be modified to accommodate the FET 116 as being a PMOS-type and/or a depletion mode FET. Other substitutions and/or alternative arrangements are contemplated within the scope of the present disclosure. It will be understood that other circuitry may be included in circuit 200. In such scenarios, other circuitry could include, for example, circuitry that may operate over a slower time scale than that of the FET 116 and/or the light-emitter device 112.

Optionally, the at least one FET 116 may be a high electron mobility transistor (HEMT). Namely, the HEMT could include a semiconductor heterostructure (e.g., GaAs/AlGaAs, AlGaN/AlN/GaN, etc.). Additionally or alternatively, the at least one FET 116 may be a high-speed high-power transistor. Furthermore, as described elsewhere herein, the at least one FET 116 could include GaN, such as an Efficient Power Conversion Corporation EPC2010C NMOS surface mount GaN enhancement mode power transistor. Additionally or alternatively, the at least one FET 116 could include SiC. For example, the first FET 220 and/or the second FET 260 could be a Wolfspeed/Cree C3M0120090J-TR SiC N-channel surface mount FET. Other FET device types and materials are contemplated herein.

In some embodiments, circuit 200 may include a return diode 210 that could be a semiconductor diode device, such as a Central Semiconductor CMPD914TR surface mount switching diode.

The circuit 200 also includes a sensing circuit 120. The sensing circuit 120 includes a voltage divider 124, a comparator 130, and an RC circuit 126. The voltage divider 124 may be coupled between the supply voltage 144 and the ground reference 146. In some embodiments, the voltage divider 124 could include two resistors. An operating voltage node 122 could be defined between the two resistors. It will be understood that other types of voltage dividers are possible and contemplated herein. In an example embodiment, the voltage at the operating voltage node 122 could be indicative of a charge of the capacitive element 114 and/or a potential light pulse emission intensity from the light-emitter device 112.

A first input 132 of the comparator 130 could be coupled to the operating voltage node 122. A second input 134 of the comparator 130 could be coupled to an RC circuit 126. As an example, the second input 134 could be coupled to a node 125 between a capacitor 126a and a resistor 126b. The capacitor 126a and the resistor 126b could be coupled in series between the controller 150/reference voltage source 142 and the ground reference 146.

It is to be understood that other arrangements of the elements of system 100 and circuit 200 are possible and contemplated herein. Specifically, while embodiments herein may relate to enhancement-mode NMOS FETs, one of ordinary skill in the art would understand that many other variations of system 100 and circuit 200 are possible to provide a fast switching capability and/or provide sub-2.5 nanosecond light pulse widths. For example, the system 100 could be modified to accommodate the aforementioned FETs as being PMOS-type and/or depletion mode FETs. All such variations are contemplated within the scope of the present disclosure.

Some example embodiments could include a system that includes a lidar. In such scenarios, the lidar includes a laser pulser circuit (e.g., laser pulser circuit 110 as illustrated and described in relation to FIG. 1). Furthermore, the lidar also includes a sensing circuit (e.g., sensing circuit 120 as illustrated and described in relation to FIG. 1).

In some embodiments, the sensing circuit is coupled to the laser pulser circuit. The sensing circuit is configured to compare a reference voltage and an operating voltage indicative of a charge of a capacitive element in the laser pulser circuit.

The lidar also includes a controller coupled to the sensing circuit. The controller could be similar or identical to controller 150 as illustrated and described in reference to FIG. 1. The controller is configured to carry out operations such as controlling emission of light pulses from the laser pulser circuit based on output from the sensing circuit.

For example, controlling the emission of light pulses from the laser pulser circuit based on output from the sensing circuit could include preventing emission of light pulses from the laser pulser circuit based on output from the sensing circuit being greater than or equal to an applicable threshold level. In such scenarios, the applicable threshold level could be indicative of an eye safety threshold or another type of laser safety guideline or standard.

Additionally or alternatively, controlling the emission of light pulses from the laser pulser circuit based on output from the sensing circuit could include modifying the emission of light pulses from the laser pulser circuit based on output from the sensing circuit being greater than or equal to an applicable threshold level. For example, if the output of the sensing circuit is greater than or equal to the threshold level, systems or methods described herein could include partially discharging the capacitive element prior to firing the laser pulser circuit at a lower laser shot power. Optionally, modifying the emission of light pulses could include adjusting a laser pulse width so as to limit the total laser energy in a given shot. Other ways to modify the emission of light pulses so as to comply with laser safety guidelines are possible and contemplated herein.

In some embodiments, the operations could additionally or alternatively include adjusting the reference voltage based on a current operating state of a vehicle. Optionally, adjusting the reference voltage could be based on environmental conditions. Such environmental conditions could include an ambient light level, a proximity to populated areas, or one or more detected objects (e.g., animate objects such as people, animals, etc., or inanimate objects such as bicycles, wagons, strollers, walkers, etc.).

In some embodiments, the system could include a vehicle. In such scenarios, the lidar could be mounted or otherwise coupled to the vehicle.

III. Example Methods

Figure 3:
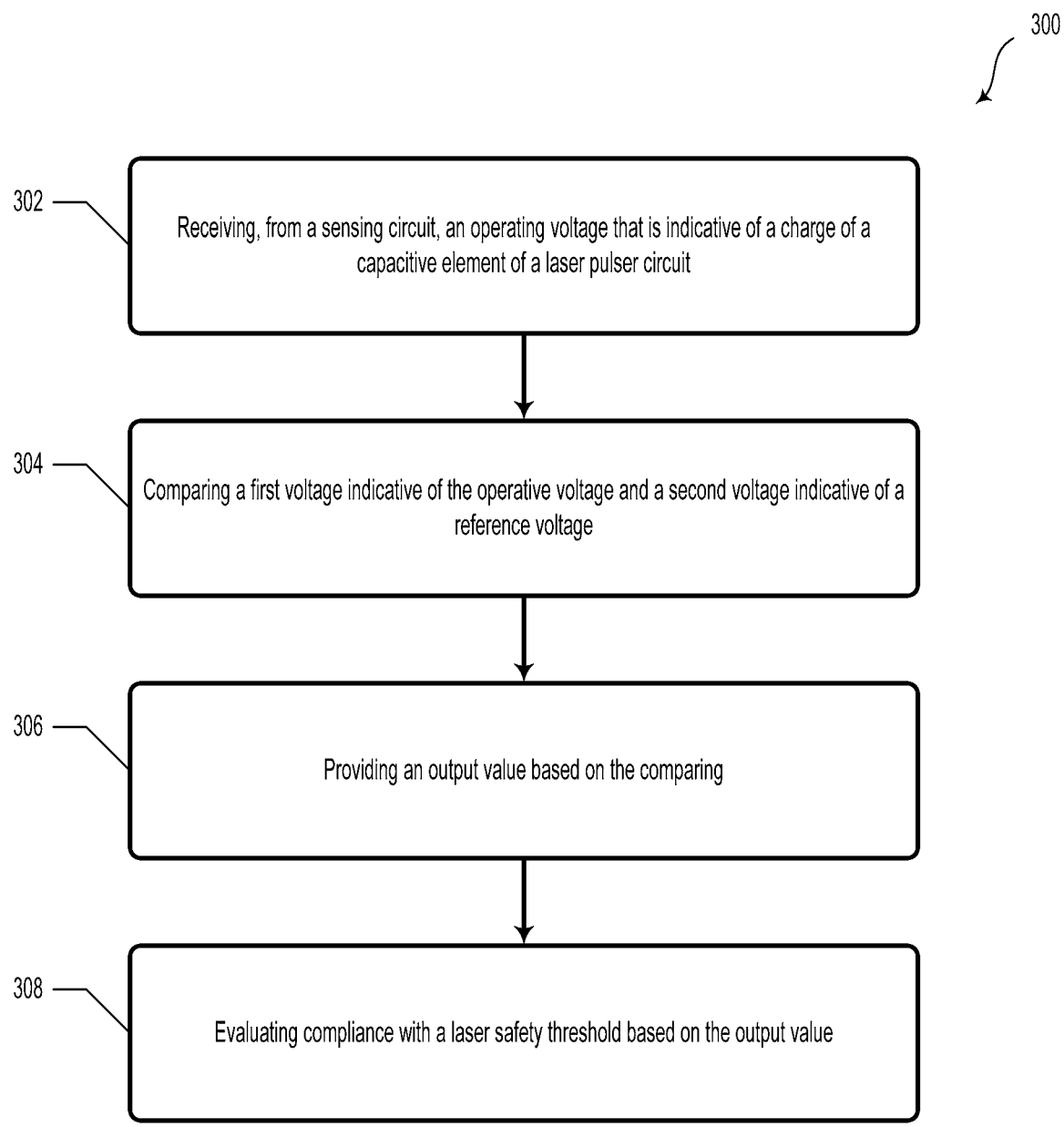
FIG. 3 illustrates a method, according to an example embodiment.

FIG. 3 illustrates a method 300, according to an example embodiment. It will be understood that the method 300 may include fewer or more steps or blocks than those expressly illustrated or otherwise disclosed herein. Furthermore, respective steps or blocks of method 300 may be performed in any order and each step or block may be performed one or more times. In some embodiments, some or all of the blocks or steps of method 300 may be carried out by controller 150 and/or other elements of system 100 and/or circuit 200 as illustrated and described in relation to FIGS. 1 and 2, respectively.

Block 302 includes receiving, from a sensing circuit, an operating voltage that is indicative of a charge of a capacitive element of a laser pulser circuit. Within the context of system 100 and circuit 200, receiving the operating voltage could include sensing, with the comparator 130, the operating voltage at node 122. The operating voltage, for example, could be between 0-100 volts, but other voltages are possible to determine a charge stored on the capacitive element 114. As an example, an operating voltage of zero may indicate that no charge is stored on the capacitive element 114 and that no light pulse will be emitted by the light-emitter device 112. As a further example, an operating voltage of 80 volts could indicate that the capacitive element 114 is fully charged and a "full power" light pulse will be emitted by the light-emitter device 112 upon a triggering pulse from the trigger source 118. It will be understood that sensing intermediate voltage levels could indicate intermediate charge levels on the capacitive element 114 and could correspond with intermediate intensity light pulses upon firing the light-emitter device 112.

Block 304 includes comparing a first voltage indicative of the operative voltage and a second voltage indicative of a reference voltage. As an example, comparator 130 could compare the voltages present at the first input 132 and the second input 134. As described above, the first input 132 could be coupled to the operating voltage node 122, which could indicate a charge level of the capacitive element 114. The second input 134 could be coupled to node 125 of an RC circuit 126. The voltage at node 125 could be controlled, at least in part, by a reference voltage source 142. In some embodiments, the reference voltage source 142 could include the controller 150. However, the reference voltage source 142 could be a controllable voltage source or power supply separate from the controller 150.

The voltage comparison could be performed by an operational amplifier, such as a power operational amplifier (e.g., Texas Instruments OPA454) and/or a high-speed operational amplifier (e.g., Analog Devices AD8000YRDZ-REEL7). Additionally or alternatively, the comparator could implemented in a FPGA or ASIC. In the case of such implementations, a differential input of an FPGA or ASIC could be utilized for the voltage comparison. Other types of comparator circuits are possible and contemplated herein.

Block 306 includes providing an output value based on the comparing. The output of the comparator could include a digital output (e.g., 0 or 5 volts) or an analog output (e.g., −12V-+12V). It will be understood that the output of the comparator could include other types of signals, such as a pulse code modulated (PCM) signal. The output signal could be received by the controller 150.

Block 308 includes evaluating compliance with a laser safety threshold based on the output value. In some embodiments, evaluating compliance with the laser safety threshold based on the output value could include comparing the output value to one or more operating thresholds. In some embodiments, the controller 150 could compare the voltage of the output signal to a lookup table stored in the memory 154. The lookup table could include one or more sets of data that provide the relationship between the output signal voltage and estimated light pulse intensity level. Furthermore, the lookup table could include one or more threshold levels that are based on laser safety regulations and/or rules. That is, the threshold levels could include "maximum" voltages that, if exceeded and a light pulse subsequently fired, could represent a violation of laser safety rules and/or regulations.

If the controller 150 determines that the output value of the comparator 130 is greater than or equal to an applicable threshold level, the controller 150 could disable the trigger source 118, discharge the capacitive element 114, close a physical shutter, or take other action to prevent firing a light pulse. If the controller 150 determines that the output value of the comparator 130 is less than the applicable threshold level, the circuit 200 could proceed to fire the light pulse by way of the trigger source 118 and the light-emitter device 112.

In some embodiments, method 300 additionally includes determining a current operating state of a vehicle. For example, the current operating state of the vehicle could relate to its location, time of day, whether the driving surface is highway or in-city, etc. In such scenarios, evaluating compliance with the laser safety threshold could be further based on the current operating state of the vehicle. That is, in some examples, method 300 could additionally or alternatively include adjusting the reference voltage based on the current operating state of the vehicle.

For example, when driving at night, the laser safety threshold level could be lowered relative to general driving conditions due to a higher laser light exposure risk (due to human pupillary response in dark conditions). Conversely, if the vehicle is in an unpopulated area, the laser safety threshold level could be increased relative to general driving conditions at least because there are no known individuals who might be subject to laser light exposure.

Additionally or alternatively, the laser safety threshold level(s) could be adjusted based on a speed of the vehicle. In such scenarios, the laser safety threshold level could be proportional to the speed of the vehicle. That is, when the vehicle is traveling slowly or stopped, the threshold level(s) could be lower than when the vehicle is traveling quickly. For example, while the vehicle is moving quickly, it is unlikely that a person would be close to the laser emissions. However, as the vehicle slows or when the vehicle is stopped, the likelihood of having a person approach the laser, or be near or cross nearby the vehicle on which the laser is mounted, may increase.

The adjustment of laser safety thresholds could be based on other environmental factors. For instance, the laser safety threshold for a given light pulse could be based on an expected distance to target and/or the type of target. As an example, if a future light pulse is to be emitted toward a human (e.g., a pedestrian), the laser safety threshold could be reduced so as to avoid shooting light pulses with intensity above laser safety guidelines (e.g., ANSI Z136, 21 C.F.R. 1040, and/or IEC 60825).

In some embodiments, the laser safety threshold could be adjusted on a shot-to-shot basis. For example, the laser safety threshold could be based on a shot pitch angle and/or shot azimuth angle. In such scenarios, differences between amounts of beam clipping (e.g., due to a partially obstructed beam) and/or differences in nearest-neighbor beam angle spacing may warrant different laser safety limits in different parts of the field of view.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various aspects and embodiments have been disclosed herein, other aspects and embodiments will be apparent to those skilled in the art. Embodiments of the present disclosure may thus relate to one of the enumerated example embodiments (EEEs) listed below.

EEE 1 is a method comprising:
receiving, from a sensing circuit, an operating voltage that is indicative of a charge of a capacitive element of a laser pulser circuit;
comparing a first voltage indicative of the operative voltage and a second voltage indicative of a reference voltage;
providing an output value based on the comparing; and
evaluating compliance with a laser safety threshold based on the output value.

EEE 2 is the method of EEE 1, further comprising:
determining a current operating state of a vehicle, wherein evaluating compliance with the laser safety threshold is further based on the current operating state of the vehicle.

EEE 3 is the method of EEE 2, further comprising:
adjusting the reference voltage, wherein adjusting the reference voltage is based on the current operating state of the vehicle.

EEE 4 is the method of EEE 1, wherein evaluating compliance with the laser safety threshold based on the output value comprises comparing the output value to one or more operating thresholds.

EEE 5 is the method of EEE 4, wherein the one or more operating thresholds comprise predetermined output value thresholds that correspond to respective operating states of a vehicle.

The various disclosed aspects and embodiments are for purposes of illustration and are not intended to be limiting, with the true scope being indicated by the following claims.

What is claimed is:

1. A system comprising:
a lidar, wherein the lidar comprises:
a laser pulser circuit;
a sensing circuit coupled to the laser pulser circuit, wherein the sensing circuit is configured to compare a reference voltage and an operating voltage indicative of a charge of a variable capacitive element in the laser pulser circuit, wherein the variable capacitive element has a capacitance that scales inversely with a supply voltage, and wherein the variable capacitive element comprises a field effect transistor (FET); and a controller coupled to the sensing circuit, wherein the controller is configured to carry out operations, the operations comprising controlling emission of light pulses from the laser pulser circuit based on output from the sensing circuit.

2. The system of claim 1, wherein controlling emission of light pulses from the laser pulser circuit based on output from the sensing circuit comprises:
modifying or preventing emission of light pulses from the laser pulser circuit based on output from the sensing circuit being greater than or equal to an applicable threshold level.

3. The system of claim 2, wherein the applicable threshold level is indicative of an eye safety threshold.

4. The system of claim 1, wherein the operations further comprise adjusting the reference voltage based on a current operating state of a vehicle.

5. The system of claim 1, wherein the operations further comprise adjusting the reference voltage based on environmental conditions comprising one or more of the following: an ambient light level, a proximity to populated areas, or one or more detected objects.

6. The system of claim 1, further comprising: a vehicle, wherein the lidar is mounted to the vehicle.

7. A system comprising:
a laser pulser circuit comprising:
a light-emitter device;
a variable capacitive element comprising a field effect transistor (FET), wherein the variable capacitive element has a capacitance that scales inversely with a supply voltage; and
a sensing circuit coupled to the variable capacitive element, wherein the sensing circuit comprises:
an operating voltage node configured to provide an operating voltage indicative of a charge of the variable capacitive element; and
a comparator, wherein the comparator comprises:
a first input coupled to the operating voltage node;
a second input coupled to a reference voltage source; and
an output; and
a controller, wherein the controller is coupled to the second input and the output, wherein the controller is configured to carry out operations, the operations comprising:
controlling a reference voltage provided by the reference voltage source;
causing the comparator to compare a first voltage at the first input and a second voltage at the second input so as to provide an output value at the output, wherein the first voltage is indicative of the operating voltage and the second voltage is indicative of the reference voltage; and
evaluating compliance with a laser safety threshold based on the output value.

8. The system of claim 7, wherein the sensing circuit further comprises a voltage divider, wherein the operating voltage node corresponds to a node of the voltage divider.

9. The system of claim 7, wherein the light-emitter device and the switch are connected in a series combination between the supply voltage and a ground reference, wherein the variable capacitive element is connected in parallel to the series combination.

10. The system of claim 9, wherein when the switch is open, the variable capacitive element is charged by the supply voltage, so as to prepare the laser pulser circuit to emit a laser light pulse.

11. The system of claim 9, wherein when the switch is closed, charge stored on the variable capacitive element flows through the light-emitter device so as to emit a light pulse.

12. The system of claim 7, wherein the sensing circuit further comprises a filter circuit, wherein the controller is coupled to the second input by way of the filter circuit.

13. The system of claim 12, wherein the filter circuit comprises a resistor capacitor (RC) circuit.

14. The system of claim 13, wherein the controller is coupled to the second input by way of a resistor of the RC circuit.

15. The system of claim 7, wherein the controller comprises at least one of a field-programmable gate array (FPGA) or an application-specific integrated circuit (ASIC).

16. The system of claim 7, wherein the output value comprises a positive or negative voltage indicative of a voltage difference between the first voltage at the first input and the second voltage at the second input.

17. The system of claim 7, wherein the output value comprises a digital output indicative of a voltage difference between the first voltage at the first input and the second voltage at the second input.

18. The system of claim 7, wherein the operations further include:
determining a current operating state of the system, wherein evaluating compliance with the laser safety threshold is further based on the current operating state of the system.

19. The system of claim 18, further comprising a vehicle, wherein the current operating state of the system is based on a current operating state of the vehicle.

20. The system of claim 7, wherein evaluating compliance with the laser safety threshold based on the output value comprises comparing the output value to one or more operating thresholds, wherein the one or more operating thresholds comprise predetermined output value thresholds that correspond to respective operating states of the system.

* * * * *